United States Patent [19]

Muscatell

[11] 4,182,503

[45] Jan. 8, 1980

[54] VARIABLE AIRFOIL ASSEMBLY

[76] Inventor: Ralph P. Muscatell, 2007 NE. 20th Ave., Fort Lauderdale, Fla. 33305

[21] Appl. No.: 914,673

[22] Filed: Jun. 9, 1978

Related U.S. Application Data

[63] Continuation-in-part of Ser. No. 768,640, Feb. 14, 1977, abandoned.

[51] Int. Cl.² .......................... B64C 3/48; B64C 9/32
[52] U.S. Cl. .................................. 244/219; 244/113; 244/218
[58] Field of Search ............... 244/218, 219, 213, 215, 244/216, 113

[56] References Cited

U.S. PATENT DOCUMENTS

| | | | |
|---|---|---|---|
| 1,828,161 | 10/1931 | Suchofsky | 244/113 |
| 2,317,267 | 4/1943 | Gazda | 244/218 |
| 4,007,896 | 2/1977 | Reynolds | 244/113 X |

FOREIGN PATENT DOCUMENTS 862921  3/1941  France ........................ 244/113

*Primary Examiner*—Barry L. Kelmachter
*Attorney, Agent, or Firm*—Oltman and Flynn

[57] ABSTRACT

The present variable airfoil assembly has an adjustable airfoil member pivotally mounted in the top of a fixed airfoil member for adjustment between a fully lowered position (for minimum wind resistance) and different raised positions in which it projects up above the top surface of the fixed airfoil member to control the lift and drag. A minimum clearance between the fixed and adjustable airfoil members is provided at the front end of the adjustable airfoil member over a range of its pivotal adjustments. The variable airfoil assembly is capable of increasing the lift of the airfoil, then lowering stalling speed, and it may either replace flaps or be used in conjunction with flaps. Higher cruise speeds can be achieved as well as good low speed performance.

7 Claims, 7 Drawing Figures

VARIABLE AIRFOIL ASSEMBLY

RELATED APPLICATION

This application is a continuation-in-part of my copending U.S. patent application Ser. No. 768,640, filed Feb. 14, 1977 now abandoned.

BACKGROUND OF THE INVENTION

The longitudinal cross-sectional shape of an airfoil, such as an airplane wing, as defined by the disposition of the mean-camber line and the distribution of thickness along the chord line, determines in part the aerodynamic properties of the airfoil and the aircraft. The chord line of the airfoil is defined by the straight line interconnecting the leading edge of the airfoil and its trailing edge. The mean-camber line of the airfoil is the line representing the locus of points disposed equidistantly between the top and bottom surfaces of the airfoil, and in conjunction therewith, the camber of the airfoil is the distance that the mean-camber line deviates from the chord line.

It has been found that a thick or highly cambered airfoil has a larger lift coefficient than that of a less cambered or thinner airfoil. However, a highly cambered airfoil also exhibits greater resistance or drag than that of a less cambered airfoil when the aircraft is in high speed flight.

Various adjustable airfoil assemblies have been proposed heretofore for converting the aircraft from high lift performance at relatively low speed to reduced lift performance and reduced drag at higher speeds.

For example, U.S. Pat. Nos. 1,803,915 to Parmele, 1,225,711 to Holle, 3,806,065 to Custer, 1,747,637 to Larsen and 2,349,858 to Gillmor show aircraft wings with an adjustable top for changing the wing's profile and wind resistance.

U.S. Pat. No. 1,631,259 to Gilmore shows an airfoil with a pivotally adjustable front nose which is changeable between a relatively blunt leading edge and a pointed leading edge.

U.S. Pat. No. 4,007,896 to Reynolds shows an adjustable flap at the trailing edge of a fixed wing for controlling the lift and drag.

U.S. Pat. Nos. 1,845,960 to Daniell and 1,881,159 to Apolloniou show pivotally adjustable panels which normally fit in the top of an aircraft wing but can be raised for braking purposes.

SUMMARY OF THE INVENTION

The present invention is directed to a novel and improved variable airfoil assembly having a fixed airfoil member, such as an airplane wing, with a recess in the top for receiving an adjustable airfoil member whose back end is pivoted. The front end of the adjustable airfoil member may be raised or lowered by a jack screw, for example, to vary accordingly the lift and drag, such as during takeoffs and landings of the aircraft. A close clearance is maintained between the adjustable airfoil member and a transverse edge in the top of the fixed airfoil member at the front of its recess.

Preferably, the pivot for the adjustable airfoil member is slidably supported in the fixed airfoil member, and the front end of the adjustable airfoil member is guided by a curved track in the fixed airfoil member to maintain the desired close clearance when the adjustable airfoil member is raised or lowered pivotally.

Alternatively, a plate-like baffle below the transverse edge in the top of the fixed airfoil member is adjustable automatically to maintain the desired close clearance with the front end of the adjustable airfoil member. Also, an air seal may be provided between the front end of the adjustable airfoil member and the inside of the recess in the top of the fixed airfoil member to substantially block this recess from the air flowing across the top of the airfoil assembly.

A principal object of this invention is to provide a novel and improved variable airfoil assembly.

Another object of this invention is to provide a novel and improved variable airfoil assembly whose camber may be adjusted by the pilot for maximum efficiency under different flight conditions.

Another object of the present invention is to provide a novel and improved variable camber airfoil assembly which facilitates the achievement of rapid and short take-offs and landings and therefore is particularly useful in the implementation of short take-offs or landings.

Another object of the present invention is to provide a novel and improved variable-camber airfoil which can exhibit decreased lift and drag forces for high speed flight conditions, as well as increased lift and drag forces for low speed flight conditions to facilitate take-off operations under heavy load conditions.

Another object of the invention is to design the primary airfoil member to allow relatively high cruise speeds and the auxilliary airfoil member to allow improved low speed performance such as during take-off and landing.

Another object of the present invention is to provide a novel and improved variable camber airfoil which can be adjusted to provide an effective lift spoiler and air brake for runway roll on landing operations of the aircraft.

Further objects and advantages of the present invention will be apparent from the following detailed description of certain presently-preferred embodiments thereof, shown in the accompanying drawings in which.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

Figure 1:
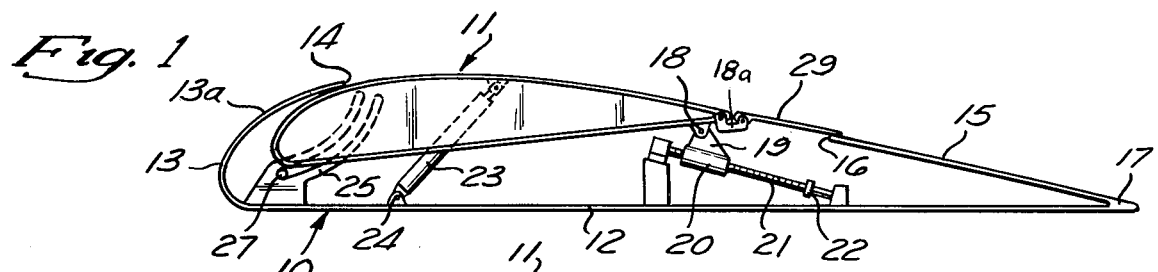
FIG. 1 is a schematic longitudinal sectional view of a first embodiment of the present variable airfoil assembly with the adjustable airfoil member fully retracted.

Referring first to FIG. 1, the present variable airfoil assembly has a fixed airfoil member 10 (preferably an airplane wing) and a pivotally adjustable airfoil member 11.

The fixed airfoil member has a continuous, substantially flat bottom wall 12, a convex nose 13 extending up from the bottom wall 12 at the front and curving rearwardly and upwardly to a top wall segment 13a which terminates in a transverse edge 14, and a rear top wall 15 beginning at a transverse edge 16 spaced behind the edge 14 and extending rearward to a convex back edge segment 17 which joins it to the back edge of the bottom wall 12. Between the transverse top edges 14 and 16 the top of the fixed airfoil member is open to provide a recess for receiving the adjustable airfoil member 11.

The adjustable airfoil member has a horizontal pivot 18 at its back end which is supported by a rigid carrier 19. The carrier 19 has a sleeve 20 at the bottom which slidably engages a fixed guide shaft 21, which is inclined downward and rearward inside the fixed airfoil member 10. Toward its lower end the inclined guide shaft 21 carries a fixed stop 22 for limiting the movement of the carrier 19, 20 downward and rearward.

Toward its front end the adjustable airfoil member 11 is pivotally coupled to the upper end of a jack screw 23 driven from a reversible motor (not shown). The lower end of the jack screw is pivotally mounted at 24 inside the fixed airfoil member 12. When the jack screw is rotated in one direction it is extended upward to raise the front end of the adjustable airfoil member 17, such as to an intermediate raised position (FIG. 2) or to the fully raised position shown in FIG. 3. When the jack screw 23 is rotated in the opposite direction the front end of the adjustable airfoil member is retracted downward. The energization of the motor for raising or lowering the jack screw is controlled by remote switches that can be operated by the pilot.

Inside the fixed airfoil member 10 at each end of the adjustable airfoil member 11 a curved track 25 is provided. The track 25 is convex and its curvature is the inverse of the convex curvature of the front end of the adjustable airfoil member 11. The adjustable airfoil member 11 carries followers in the form of rollers or pins 27 on the bottom at its front end which are slidably received in the respective tracks 25 for guiding the upward or downward movement of the front end of the adjustable airfoil member 11 when the jack screw 23 is extended or retracted.

The position of the tracks 25 in the fixed airfoil member 10 and the curvature of these tracks are such that when the rollers 27 on the adjustable airfoil member are at the lower front ends of the tracks, the front end of the adjustable airfoil member 11 extends beneath and forwardly of the transverse top edge 14 on the fixed airfoil member 10. In this fully lowered position of the adjustable airfoil member 11 its top surface merges smoothly with the top surface of the nose 13 of the fixed airfoil member 10, with only a small clearance between them at 28.

At its back end the adjustable airfoil member 11 presents a sheet-like rear extension 29 on the top which extends behind its pivot 18a and closely overlies the top 15 of the fixed airfoil member behind the latter's transverse edge 16.

When the jack screw 23 is extended to raise the front end of the adjustable airfoil member 11 from its fully lowered position, the curvature of the guide tracks 25 is such that the front end of the adjustable airfoil member is guided rearward (to the right in FIGS. 1 and 2) as it is raised, so as to maintain substantially the same close clearance at 28 of the adjustable airfoil member 11 from the transverse edge 14 on top of the fixed airfoil member 10.

Figure 2:
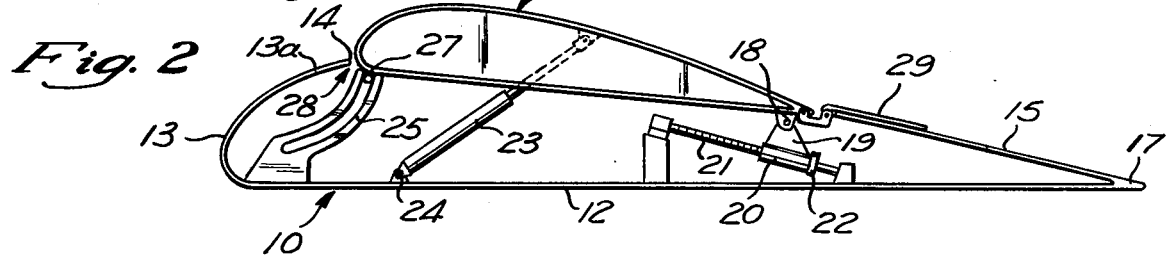
FIG. 2 is a view similar to FIG. 1 but with the adjustable airfoil member partly raised.

As the front end of the adjustable airfoil member 11 is raised and is guided rearward by the tracks 25, its back end pivot 18 is displaced rearward and downward, with the pivot carrier 19, 20 sliding rearward and downward along the guide shaft 21. This rearward and downward displacement of the pivot 18 ends when the sleeve 20 engages the stop 22 (FIG. 2). In this position the front end of the adjustable airfoil member 11 is retracted from beneath the nose 13 of the fixed airfoil member 10 and can move up past it upon continued extension of the jack screw 23, as shown in FIG. 3.

From the foregoing it will be evident that the present airfoil may be adjusted from the position shown in FIG. 1, in which it provides relatively low lift and low drag, through a range of partly raised positions of the adjustable airfoil member 11, in which the lift and drag are increased. The sliding pivot 18 and the guide tracks 25 cooperate to maintain the desired minimum clearance between the transverse top edge 14 on the fixed airfoil member 11 and the top surface of the adjustable airfoil member 11 at the front thereof throughout this range of adjustment.

Figure 3:
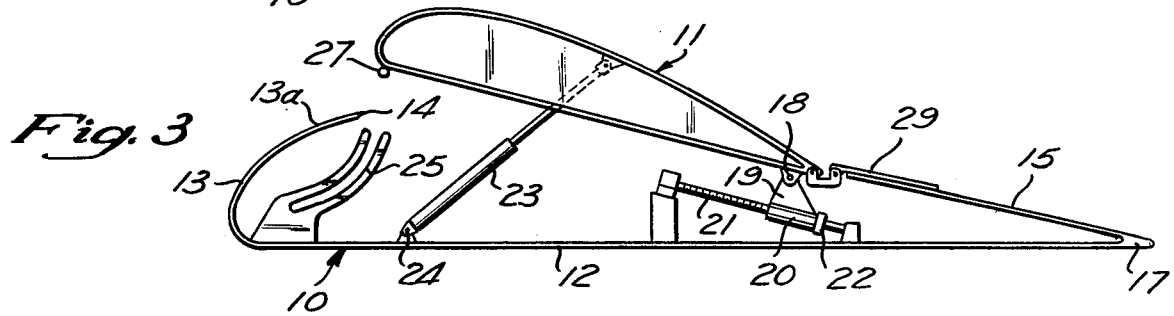
FIG. 3 is a view similar to FIG. 2 but with the adjustable airfoil member fully raised.

In addition, the adjustable airfoil member 11 may be raised above the FIG. 2 position throughout a range of adjustments up to the fully raised position of FIG. 3 to increase the drag accordingly, such as for braking purposes.

Figure 4:
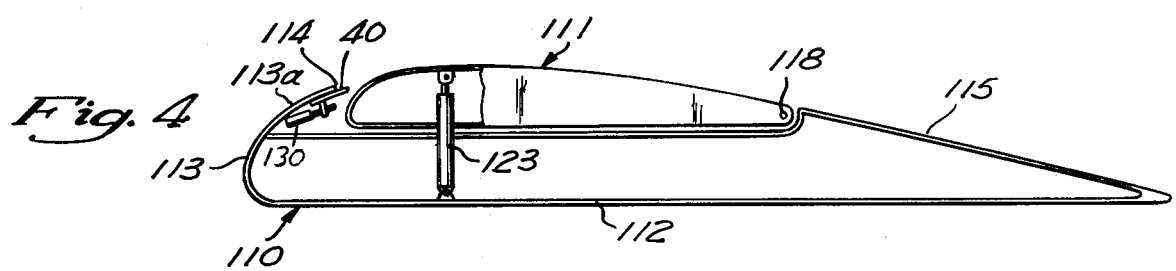
FIG. 4 is a schematic longitudinal sectional view of a second embodiment of the present variable airfoil assembly with the adjustable airfoil member fully retracted.
Figure 5:
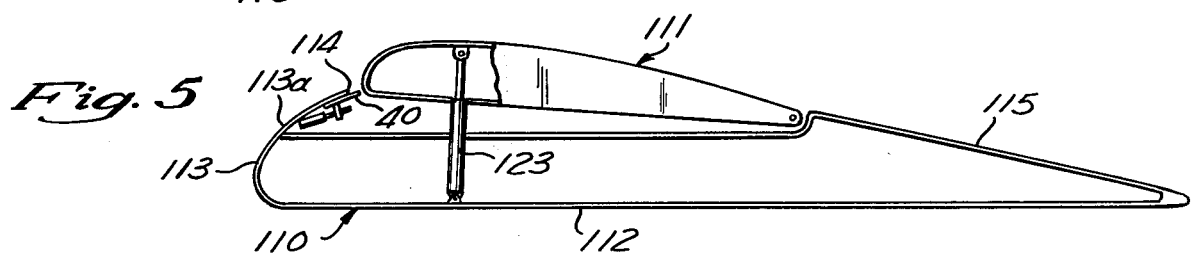
FIG. 5 is a view similar to FIG. 4 but with the adjustable airfoil member in an extended position.

FIGS. 4 and 5 illustrate a second embodiment of the invention in which elements which correspond to the elements in the embodiment of FIGS. 1–3 have the same reference numeral plus 100.

In FIGS. 4 and 5, the pivot 118 for the adjustable airfoil member 111 is fixed.

A platelike baffle 40 is slidably mounted in the fixed airfoil member 110 immediately in front of the adjustable airfoil member 111 closely below the transverse top edge 114 on the fixed airfoil member. The position of this baffle longitudinally of the airfoil assembly (i.e., from left to right in FIG. 4) is automatically adjusted by means of a motor and worm screw device 130 connected to baffle 40 as the front end of the adjustable airfoil member is raised or lowered, so as to maintain a desired minimum clearance between the front face of the adjustable airfoil member and the back edge of the baffle. This automatic adjustment of the baffle may be effected by operating remote switches which control the motor and worm screw device 130.

Figure 6:
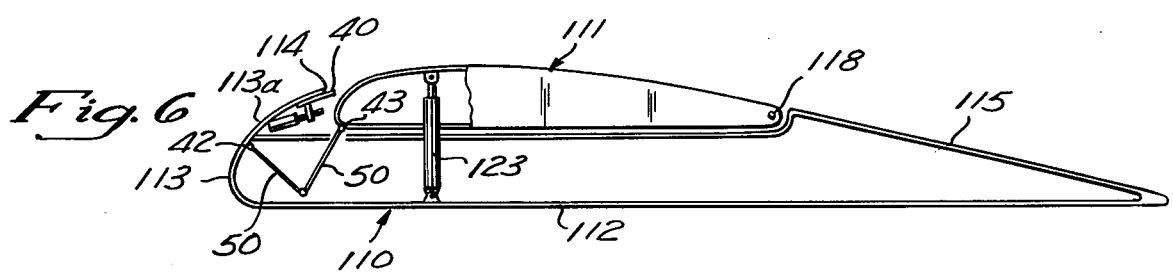
FIG. 6 is a fragmentary schematic longitudinal sectional view showing a modification of the airfoil of FIGS. 4 and 5.
Figure 7:
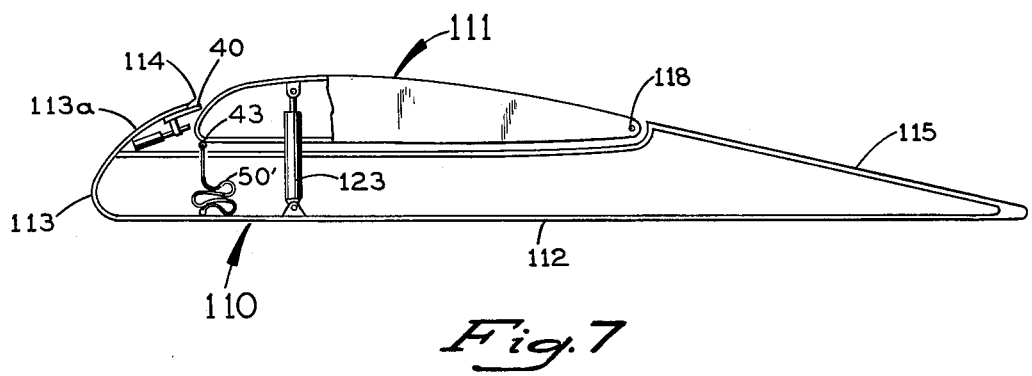
FIG. 7 shows a flexible web in place of element 50 in FIG. 6.

FIG. 6 shows an arrangement in which pivotally interconnected plates 50 with connections 42 and 43 provide an air seal between the inside of the airfoil members 110 and 111. The plates 50 can be replaced by a flexible web 50' as shown in FIG. 7. In other respects the embodiment of FIG. 6 is the same as that of FIGS. 4 and 5.

In all embodiments, a plurality of the operating devices are distributed along the length of the wing of an aircraft.

I claim:

1. In a variable airfoil assembly for achieving adjustability between cruise speed performance and low speed performance, the airfoil having:
   a fixed airfoil member with a bottom wall, a convex nose extending upward and curving rearward from the front end of said bottom wall to a top wall segment which terminates in a transverse edge at the front of a recess in the top of the fixed airfoil member above said bottom wall;

an adjustable airfoil member in said recess pivotally mounted away from its front end for adjustment between a fully lowered position fitting in said recess and raised positions in which its front end extends above from the top of said fixed airfoil member, said adjustable airfoil member having a top surface which provides a smooth continuation of said top segment of the fixed airfoil member in front of said recess when the adjustable airfoil member is in its fully lowered position;

and means for selectively raising the front end of said adjustable airfoil member from its fully lowered position;

the improvement which comprises:

means for maintaining a minimum clearance between said transverse edge in the top of said fixed airfoil member and the front end of said adjustable airfoil member in different raised positions of said adjustable airfoil member comprising:

a slidable pivot for said adjustable airfoil member;

and means supporting said pivot to position the front end of the adjustable airfoil member beneath said top wall segment of the fixed airfoil member in said fully lowered position of the adjustable airfoil member and for sliding said pivot rearward along said fixed airfoil member to retract the front end of the adjustable airfoil member from beneath said top wall segment of the fixed airfoil member as the front end of the adjustable airfoil member is raised;

and further comprising:

means providing an upwardly and rearwardly curved track with a curvature inverse to that of said nose on the adjustable airfoil member;

and a follower slidable along said track;

said track and said follower acting between said fixed and adjustable airfoil members to guide the front end of said adjustable airfoil member from beneath said top wall segment of the fixed airfoil member as said pivot is slid rearward and the front end of the adjustable airfoil member is raised.

2. A variable airfoil assembly according to claim 1, wherein said maintaining means further comprises:

a baffle mounted in said fixed airfoil member beneath said transverse edge and extending into close proximity to the front end of the adjustable airfoil member when said adjustable airfoil member is in its fully lowered position, said baffle being automatically adjustable to maintain said close proximity to the front end of the adjustable airfoil member in different raised positions of said adjustable airfoil member.

3. A variable airfoil assembly according to claim 2, and further comprising:

means for providing an air seal between the interior of said recess in the fixed airfoil member and the front end of said adjustable airfoil member in different positions of said adjustable airfoil member.

4. A variable airfoil assembly according to claim 3, wherein said last-mentioned means is a flexible web extending between the adjustable airfoil member and the interior of said recess in the fixed airfoil member in front of the adjustable airfoil member.

5. A variable airfoil assembly according to claim 3, wherein said last-mentioned means comprises pivotally interconnected plates extending between the adjustable airfoil member and the interior of said recess in the fixed airfoil member in front of the adjustable airfoil member.

6. A variable airfoil assembly according to claim 1, and further comprising:

means extending between the adjustable airfoil member and the interior of said recess in the fixed airfoil member in front of the adjustable airfoil member for providing an air seal between them in different positions of the adjustable airfoil member.

7. In a variable airfoil assembly having:

a fixed airfoil member with a bottom wall, a convex nose extending upward and curving rearward from the front end of said bottom wall to a top wall segment which terminates in a transverse edge at the front of a recess in the top of the fixed airfoil member above said bottom wall;

and an adjustable airfoil member in said recess pivotally mounted away from its front end for adjustment between a fully lowered position fitting in said recess and raised positions in which its front end extends up from the top of said fixed airfoil member, said adjustable airfoil member having a top surface which provides a smooth continuation of said top wall segment of the fixed airfoil member in front of said recess when the adjustable airfoil member is in its fully lowered position;

the improvement which comprises:

a slidable pivot for said adjustable airfoil member;

and means supporting said pivot to position the front end of the adjustable airfoil member beneath said top wall segment of the fixed airfoil member in said fully lowered position of the adjustable airfoil member and for sliding said pivot rearward along said fixed airfoil member to retract the front end of the adjustable airfoil member from beneath said top wall segment of the fixed airfoil member as the front end of the adjustable member is raised;

means providing an upwardly and rearwardly curved track with a curvature inverse to that of said nose on the adjustable airfoil member;

and a follower slidable along said track;

said track and said follower acting between said fixed and adjustable airfoil members to guide the front end of said adjustable airfoil member from beneath said top wall segment of the fixed airfoil member as said pivot is slid rearward and the front end of the adjustable airfoil member is raised.

* * * * *